(12) United States Patent
Kim et al.

(10) Patent No.: US 10,985,898 B2
(45) Date of Patent: *Apr. 20, 2021

(54) METHOD FOR MITIGATING SELF-INTERFERENCE IN FDR COMMUNICATION ENVIRONMENT

(71) Applicant: LG ELECTRONICS INC., Seoul (KR)

(72) Inventors: Kitae Kim, Seoul (KR); Jaehoon Chung, Seoul (KR); Jinmin Kim, Seoul (KR); Kukheon Choi, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/504,167

(22) Filed: Jul. 5, 2019

(65) Prior Publication Data

US 2019/0327068 A1 Oct. 24, 2019

Related U.S. Application Data

(63) Continuation of application No. 15/107,426, filed as application No. PCT/KR2014/012324 on Dec. 15, 2014, now Pat. No. 10,382,185.

(Continued)

(51) Int. Cl.
*H04L 5/14* (2006.01)
*H04W 72/08* (2009.01)
(Continued)

(52) U.S. Cl.
CPC .............. *H04L 5/14* (2013.01); *H04B 1/525* (2013.01); *H04L 1/0009* (2013.01);
(Continued)

(58) Field of Classification Search
CPC ..... H04L 5/14; H04L 5/0048; H04L 25/0226; H04L 1/0009; H04L 5/1461; H04B 1/525;
(Continued)

(56) References Cited

U.S. PATENT DOCUMENTS 9,019,849 B2  4/2015 Hui et al.
9,225,493 B2  12/2015 He et al.
(Continued)

FOREIGN PATENT DOCUMENTS

JP  2008067211  3/2008
JP  2013542642  11/2013
(Continued)

OTHER PUBLICATIONS

U.S. Appl. No. 15/107,907, Office Action dated Feb. 23, 2018, 2, pages.
(Continued)

*Primary Examiner* — Christopher P Grey
(74) *Attorney, Agent, or Firm* — Lee, Hong, Degerman, Kang & Waimey

(57) ABSTRACT

Disclosed are a method and a base station for mitigating self-interference in which, in a resource region for transmitting a plurality of downlink control channels, an overlap region is configured, the overlap region being a resource region from which the effects of self-interference due to an uplink communication of a terminal must be removed, and the information regarding the overlap region is transmitted to a terminal connected to a base station and communicating via FDR.

16 Claims, 7 Drawing Sheets

Related U.S. Application Data

(60) Provisional application No. 61/920,480, filed on Dec. 24, 2013.

(51) Int. Cl.

| | |
|---|---|
| *H04B 1/525* | (2015.01) |
| *H04L 1/00* | (2006.01) |
| *H04L 5/00* | (2006.01) |
| *H04L 25/02* | (2006.01) |
| *H04W 52/14* | (2009.01) |
| *H04W 72/04* | (2009.01) |
| *H04W 52/24* | (2009.01) |
| *H04W 88/02* | (2009.01) |
| *H04W 88/08* | (2009.01) |

(52) U.S. Cl.
CPC ........ *H04L 5/0048* (2013.01); *H04L 25/0226* (2013.01); *H04W 52/146* (2013.01); *H04W 72/042* (2013.01); *H04W 72/082* (2013.01); *H04W 52/24* (2013.01); *H04W 88/02* (2013.01); *H04W 88/08* (2013.01)

(58) Field of Classification Search
CPC ... H04B 7/2612; H04B 15/02; H04W 72/042; H04W 72/082; H04W 52/146; H04W 88/02; H04W 88/08; H04W 52/24
See application file for complete search history.

(56) References Cited

U.S. PATENT DOCUMENTS

| | | | |
|---|---|---|---|
| 9,572,038 | B2 | 2/2017 | Khandani |
| 10,382,185 | B2* | 8/2019 | Kim .................. H04B 1/525 |
| 2008/0062896 | A1 | 3/2008 | Shirakabe et al. |
| 2010/0022201 | A1 | 1/2010 | Vandenameele |
| 2011/0038283 | A1 | 2/2011 | Yu et al. |
| 2011/0143655 | A1 | 6/2011 | Ahn et al. |
| 2012/0063369 | A1 | 3/2012 | Lin et al. |
| 2012/0063373 | A1 | 3/2012 | Chincholi et al. |
| 2012/0155336 | A1 | 6/2012 | Khojastepour et al. |
| 2012/0201173 | A1 | 8/2012 | Jain et al. |
| 2012/0250526 | A1 | 10/2012 | Zhao et al. |
| 2013/0083672 | A1 | 4/2013 | Johansson et al. |
| 2013/0114468 | A1 | 5/2013 | Hui et al. |
| 2013/0155912 | A1 | 6/2013 | Khojastepour et al. |
| 2013/0188530 | A1 | 7/2013 | Pirskanen et al. |
| 2013/0223294 | A1 | 8/2013 | Karjalainen et al. |
| 2013/0286903 | A1 | 10/2013 | Khojastepour et al. |
| 2013/0301488 | A1 | 11/2013 | Hong et al. |
| 2014/0133411 | A1* | 5/2014 | Park .................. H04L 5/0058 370/329 |
| 2014/0241276 | A1* | 8/2014 | Berberana .......... H04W 72/082 370/329 |
| 2015/0180640 | A1 | 6/2015 | Liu |
| 2015/0229461 | A1* | 8/2015 | DiFazio .................. H04L 5/14 370/280 |
| 2015/0280887 | A1* | 10/2015 | Ko ...................... H04B 1/525 370/330 |
| 2016/0234003 | A1 | 8/2016 | Wang et al. |
| 2016/0323830 | A1 | 11/2016 | Kim et al. |
| 2016/0330011 | A1* | 11/2016 | Lee .................. H04L 5/0066 |
| 2017/0005776 | A1 | 1/2017 | Kim et al. |
| 2018/0205533 | A1 | 7/2018 | Lee et al. |

FOREIGN PATENT DOCUMENTS

| | | |
|---|---|---|
| JP | 2015524212 | 8/2015 |
| KR | 20010050851 | 6/2001 |
| KR | 20100121392 | 11/2010 |
| KR | 20110054073 | 5/2011 |
| WO | 2013185106 | 12/2013 |
| WO | 2015094914 | 6/2015 |

OTHER PUBLICATIONS

Renesas Mobile, "HARQ Procedure for Full Duplex Mode in CC specific TDD configuration", 3GPP TSG RAN WG1 Meeting #67, R1-113888, Nov. 2011, 5 pages.

U.S. Appl. No. 15/107,907, Notice of Allowance dated Jun. 26, 2018, 15 pages.

PCT International Application No. PCT/KR2014/012337, Written Opinion of the International Searching Authority dated Mar. 25, 2015, 17 pages.

PCT International Application No. PCT/KR2014/012324, Written Opinion of the International Searching Authority dated Mar. 25, 2015, 16 pages.

Samsung, "Full duplex multiplexing of Un and Uu subframes", 3GPP TSG RAN WG1 Meeting #60, R1-101197, Feb. 2010, 3 pages.

NTT Docomo, "Deployment scenarios and interference mitigation schemes for eIMTA", 3GPP TSG RAN WG1 Meeting #72, R1-130755, Feb. 2013, 8 pages.

U.S. Appl. No. 15/107,426, Notice of Allowance dated Apr. 17, 2019, 22 pages.

* cited by examiner

METHOD FOR MITIGATING SELF-INTERFERENCE IN FDR COMMUNICATION ENVIRONMENT

CROSS-REFERENCE TO RELATED APPLICATIONS

This application is a continuation of U.S. patent application Ser. No. 15/107,426, filed on Jun. 22, 2016, now U.S. Pat. No. 10,382,185, which is the National Stage filing under 35 U.S.C. 371 of International Application No. PCT/KR2014/012324, filed on Dec. 15, 2014, which claims the benefit of U.S. Provisional Application No. 61/920,480, filed on Dec. 24, 2013, the contents of which are all hereby incorporated by reference herein in their entirety.

TECHNICAL FIELD

The present invention relates to a method and a base station for mitigating self-interference of a UE in an environment in which the base station and the UE perform FUR communication.

BACKGROUND ART

A base station (BS) or a mobile terminal performs communication using a frequency division duplex (FDD) scheme, in which a transmission/reception resource of a signal is divided into frequencies, and a half duplex radio (HDR) scheme which employs a time division duplex (TDD) scheme, in which the transmission/reception resource is divided into time slots.

However, in the HDR communication scheme, transmission and reception cannot be performed simultaneously within the same frequency/time resource. Accordingly, introduction of the FDR communication scheme has been proposed for more efficient resource use. FDR communication refers to a scheme in which a BS or a terminal performs transmission and reception operations simultaneously using a resource of the same time-frequency region.

In FDR communication environments, since a BS and a terminal simultaneously perform transmission and reception using the same time-frequency resources, a signal transmitted from the BS or terminal is received through a reception antenna of the same BS or terminal, that is, self-interference is generated. Self-interference must be cancelled in order to guarantee FDR communication performance since a signal transmitted through a transmission antenna of a BS or a terminal is directly received through a reception antenna thereof and thus signal intensity is very high. Various schemes have been proposed in order to efficiently cancel such self-interference.

DISCLOSURE

Technical Problem

An object of the present invention devised to solve the problem lies in reduction of self-interference generated in FDR communication environments to guarantee smooth communication between a BS and a terminal.

Another object of the present invention is to provide a scheme in which a BS previously provides information about a specific resource region to a terminal such that the terminal can reduce self-interference generated during uplink communication.

Yet another object of the present invention is to provide a scheme in which a BS differently sets a resource region in which self-interference will be mitigated in consideration of control channel type and self-interference cancellation performance of a terminal so as to perform efficient self-interference mitigation according to situation.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method of mitigating self-interference includes: setting an overlap region corresponding to a resource region in which the influence of self-interference caused by uplink communication of the UE needs to be removed, from among resource regions for transmission of a plurality of downlink control channels; and transmitting information about the overlap region to UEs connected to the BS to perform FDR communication.

The setting of the overlap region may include: determining priority of the plurality of downlink control channels on the basis of types of the plurality of downlink control channels; and setting a resource region allocated to one or more downlink control channels selected in descending order of the priority to the overlap region.

The information about the overlap region may be configured as a bitmap, wherein the bitmap includes a protection setting index indicating types of the one or more downlink control channels included in the overlap region, protection priority of the one or more downlink control channels included in the overlap region, and self-interference cancellation capacity of the UE.

The method may further include receiving information about self-interference cancellation capacity of the UE from the UE before the overlap region is set, wherein the setting of the overlap region comprises setting the overlap region in consideration of the received information about self-interference cancellation capacity.

The setting of the overlap region may include setting fewer resource regions, from among the resource regions for transmission of downlink control channels to the overlap region, as self-interference cancellation capacity increases.

The transmitting of the information about the overlap region may include broadcasting the information to one or more UEs connected to the BS.

The information about the overlap region may include information about at least one of the position, arrangement structure and size of the overlap region from among the resource regions for transmission of downlink control channels.

In another aspect of the present invention, a method of mitigating self-interference includes: receiving, from a BS, information about an overlap region corresponding to a resource region in which the influence of self-interference caused by uplink communication to the BS needs to be removed, from among resource regions for transmission of a plurality of downlink control channels; and mitigating self-interference from a resource region corresponding to the overlap region, from among resource regions for transmission of uplink data channels, on the basis of the received information about the overlap region.

In another aspect of the present invention, a BS includes a transmitter, a receiver and a processor connected to the transmitter and the receiver and operating to mitigate self-interference of the UE, wherein the processor sets an overlap region corresponding to a resource region in which the influence of self-interference caused by uplink communication of the UE needs to be removed, from among resource regions for transmission of a plurality of downlink control channels and controls the transmitter to transmit information about the overlap region to UEs connected to the BS to perform FDR communication.

In another aspect of the present invention, a UE includes a transmitter, a receiver and a processor connected to the transmitter and the receiver and operating to mitigate self-interference, wherein the processor controls the receiver to receive, from a BS, information about an overlap region corresponding to a resource region in which the influence of self-interference caused by uplink communication to the BS needs to be removed, from among resource regions for transmission of a plurality of downlink control channels and mitigates self-interference from a resource region corresponding to the overlap region, from among resource regions for transmission of uplink data channels, on the basis of the received information about the overlap region.

Advantageous Effects

According to embodiments of the present invention, the following advantages can be obtained.

Firstly, self-interference generated according to uplink communication of a UE in FDR communication environments can be minimized.

Secondly, a BS informs the UE of information related to mitigation of self-interference of the UE such that the UE can easily alleviate self-interference thereof.

Thirdly, self-interference of the UE can be mitigated in consideration of priority according to control channel type or self-interference cancellation capacity of the UE, achieving efficient self-interference cancellation.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE

Figure 1:
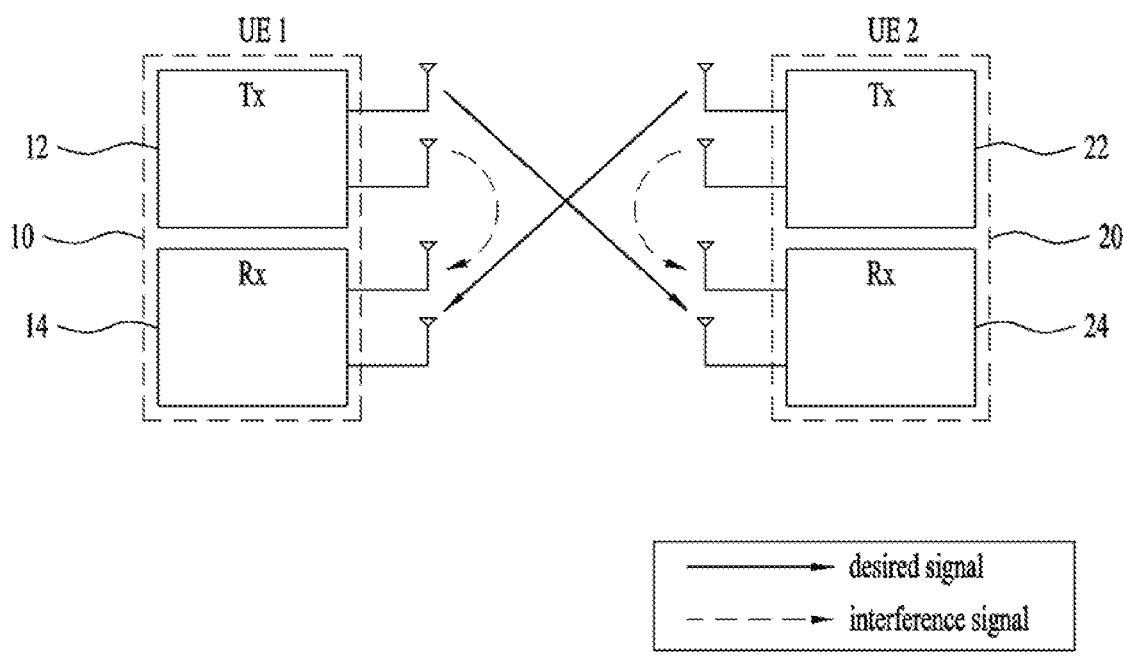
FIG. 1 illustrates an FDR communication environment.

Although the terms used in this specification are selected, as much as possible, from general terms that are widely used at present while taking into consideration the functions of the elements obtained in accordance with one embodiment, these terms may be replaced by other terms based on intentions of those skilled in the art, customs, emergence of new technologies, or the like. In addition, in certain instances, terms that are arbitrarily selected by the applicant may be used. In this case, meanings of these terms will be disclosed in detail in the corresponding part of the description of the invention. Accordingly, the terms used herein should be defined based on practical meanings thereof and the whole content of this specification, rather than based on names of the terms.

The embodiments described below are constructed by combining elements and features of the present invention in a predetermined form. The elements or features may be considered selective, if not explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features from another embodiment.

In describing the drawings, procedures or steps, which may obscure the main point of the present invention, will not be described nor will description of procedures or steps, which may be understood by those having ordinary skill in the art, be given.

In this specification, "comprise" or "include" should be understood as not precluding existence of one or more other constituents, if not stated otherwise. In addition, the terms "unit", "-er", "module", etc. signify a unit that processes at least one function or operation and may be implemented in hardware, software, or a combination of hardware and software. As used in the specification and appended claims, the terms "a", "an", "one", "the" and other similar terms include both singular and plural forms, unless context clearly dictates otherwise.

In this specification, embodiments of the present invention are described, focusing on the relationship between a base station (BS) and a mobile station (MS) in transmission/reception of data. Herein, the base station serves as a terminal node of a network that directly performs communication with mobile stations. In this document, an operation described as being performed by the base station may be performed by an upper node of the base station in some cases.

That is, in a network comprised of a plurality of network nodes including a BS, various operations performed for communication with an MS may be performed by the BS, or network nodes other than the BS. The term "base station"

may be replaced with the terms "fixed station", "Node B", "eNode B (eNB)", "advanced base station (ABS)", or "access point".

In addition, the term "mobile station (MS)" may be replaced with a term "user equipment (UE)", "subscriber station (SS)", "mobile subscriber station (MSS)", "mobile terminal", "advanced mobile station (AMS)", or "terminal". Particularly, the term mobile station used in this specification may have same meaning as the term machine-to-machine device.

A transmitter refers to a fixed and/or mobile node that provides a data service or a voice service, and a receiver refers to a fixed and/or mobile node that receives a data service or a voice service. Therefore, an MS may serve as a transmitter and a BS may serve as a receiver, on uplink. Likewise, the MS may serve as a receiver and the BS may serve as a transmitter, on downlink.

Communication between a device and "a cell" may refer to transmission and reception between the device and a BS of the cell. That is, while a target to/from which the device transmits/receives signals may be a specific BS, transmission/reception between the device and the specific BS can be described as transmission/reception between the device and the cell formed by the specific BS for convenience. Similarly, "a macro cell" and/or "a small cell" may refer to not only coverages thereof but also "a macro BS supporting the macro cell" and/or "a small cell BS supporting the small cell".

The embodiments of the present invention may be supported by standard documents disclosed for at least one of an Institute of Electrical and Electronics Engineers (IEEE) 802.xx system, a 3rd Generation Partnership Project (3GPP) system, a 3GPP Long Term Evolution (LTE) system, a 3GPP LTE-Advanced (LTE-A) system, and a 3GPP2 system, which are wireless access systems. That is, obvious steps or portions which are not described in the embodiments of the present invention may be supported by the above documents.

All terms used herein may be explained by the standard documents. Particularly, the embodiments of the present invention may be supported by at least one of P802.16e-2004, P802.16e-2005, P802.16.1, P802.16p, and P802.16.1b, which are standard documents of the IEEE 802.16 system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

In the following description of the embodiments of the present invention, specific terms are used in order to provide a thorough understanding of the present invention. These terms may be changed without departing from the spirit of the present invention.

1. FDR Communication

FIG. 1 illustrates an FDR communication environment. As described above, in an FDR communication environment, a BS and a UE performs uplink or downlink communication using the same frequency/time resources.

As shown in FIG. 1, since UE 1 10 and UE 2 20 perform communication using the same frequency/time resources in the FUR communication environment, each UE needs to simultaneously perform reception of a signal transmitted from a BS or the other UE and transmission of a signal thereto. Accordingly, a communication environment in which signals transmitted through transmission antennas 12 and 22 of UE 1 10 and UE 2 20 are directly input to reception antennas 14 and 24 thereof to cause self-interference is formed, as represented by dotted lines in FIG. 1.

Figure 2:
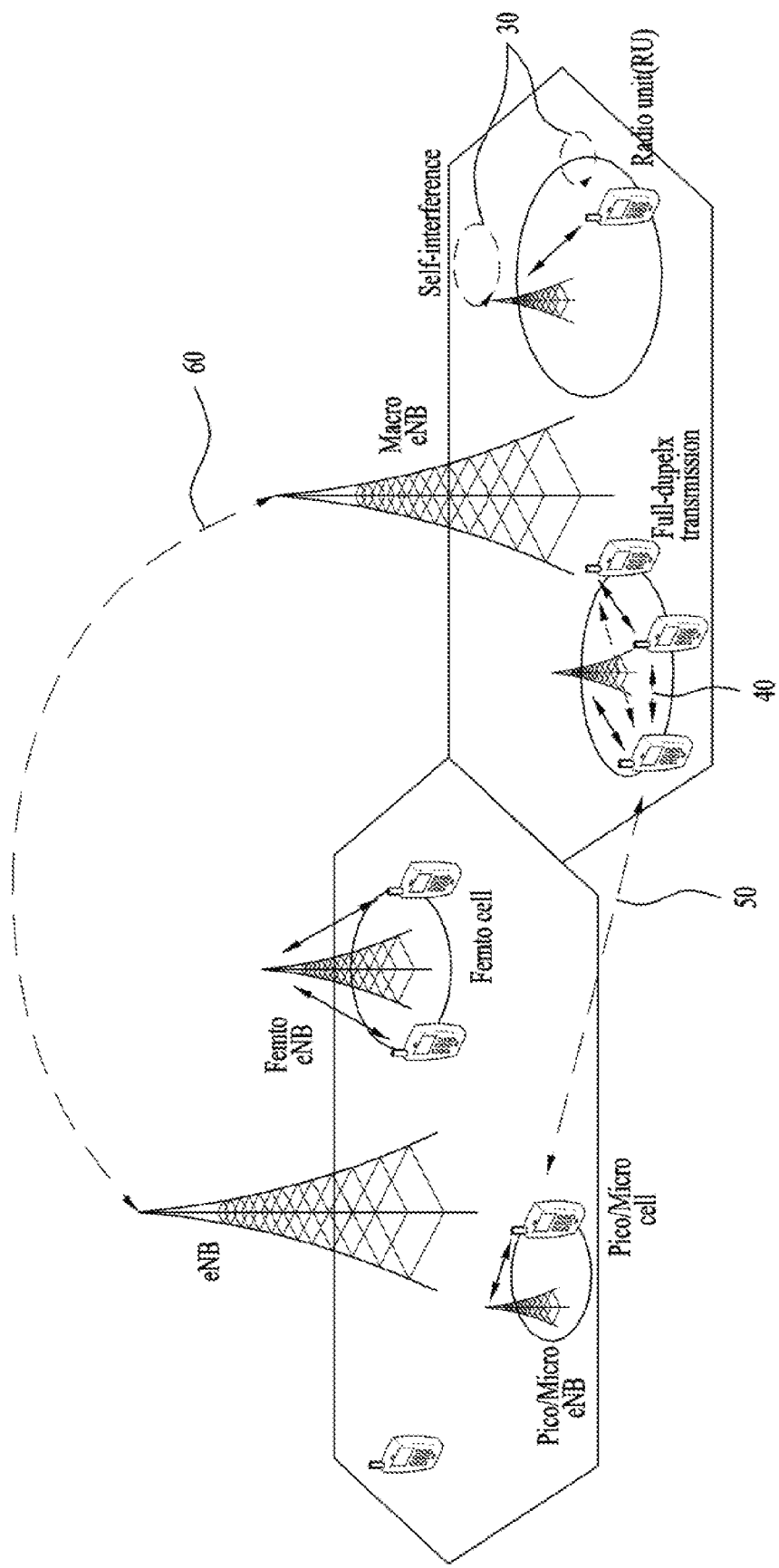
FIG. 2 is a view for explaining interferences generated in an FDR communication environment.

FIG. 2 is a view for explaining interferences generated in an FDR communication environment.

FIG. 2 shows a multi-cell environment in which a macro cell formed by a macro BS and small cells (pico/femto/micro cells) formed by pico/femto/micro BSs coexist. When FDR communication is performed in such multi-cell environment, various interferences need to be considered. Referring to FIG. 2, self interference or self-user interference, multi-user interference and inter-BS interference need to be considered according to introduction of FDR communication.

First, regarding the self-interference, the transmitter and receiver of a UE or a BS performs transmission and reception using the same time/frequency resource. Since the transmitter and receiver are positioned close to each other, a signal transmitted from a UE or a BS may be introduced into the receiver of the same UE or BS. In FIG. 2, reference numeral 30 denotes self-interference of the BS and UEs.

Next, the multi-user interference may occur when two or more UEs positioned close enough to affect each other communicate with each other using the same time/frequency resource. FIG. 2 exemplarily shows multi-user interference 40 and 50 occurring between UEs according to FDR communication therebetween.

Lastly, inter-BS interference, which is similar to the aforementioned multi-user interference, may occur between two or more BSs. FIG. 2 shows inter-BS interference 60.

As described above, while FDR communication can increase frequency efficiency by sharing the same time/frequency resources on uplink/downlink, frequency efficiency enhancement may be restricted due to interference increase.

2. Self-Interference

From among interferences generated according to FDR communication, self-interference is received with high intensity of approximately 60 to 90 dB compared to intensity of a desired signal. Since self-interference considerably affects signal processing of a receiving end compared to other types of interference, a process of cancelling self-interference is very important in FDR communication. A description will be given of a method of cancelling self-interference in FDR communication.

Figure 3:
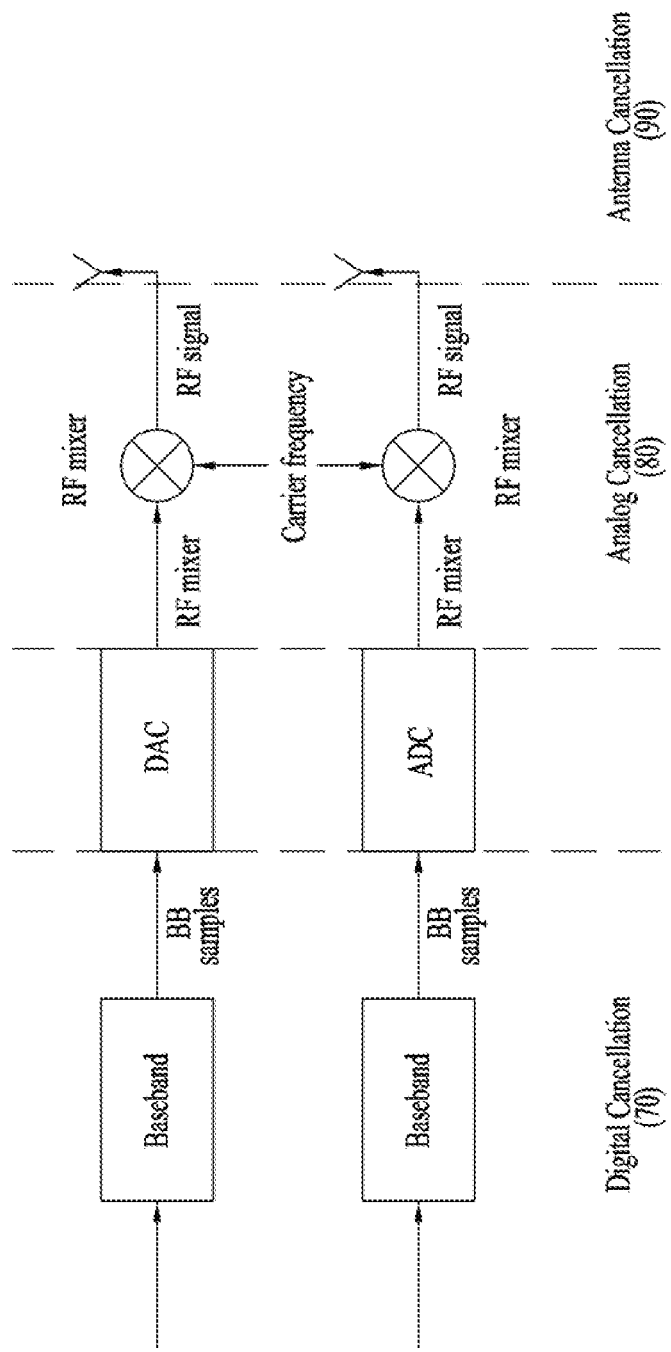
FIG. 3 illustrates methods for cancelling interference in an FDR communication environment.

FIG. 3 illustrates methods for cancelling interference in an FDR communication environment.

In FIG. 3, as methods for cancellation of self-interference, digital cancellation 70, which is applied before signals processed in a base band pass through a digital-to-analog converter (DAC) (or after reception signals pass through an analog-to-digital converter (ADC)), analog cancellation 80, which is applied after a transmission signal passes through a DAC (or before a reception signal passes through an ADC), and antenna cancellation 90 of cancelling an aggregate signal received through a transmit antenna by adjusting the distances between two or more transmit antennas are proposed.

Figure 4:
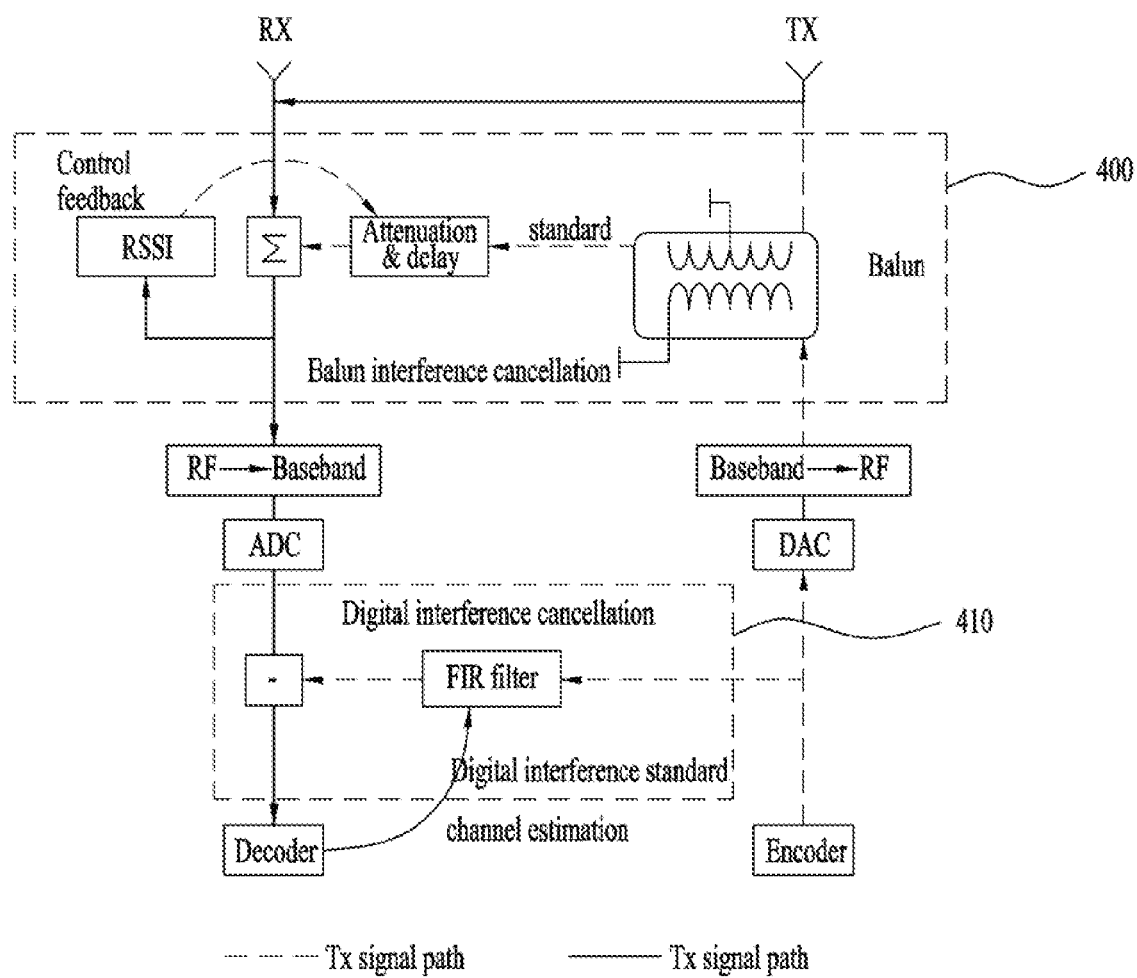
FIG. 4 illustrates digital interference cancellation and analog interference cancellation for canceling interference in an FDR communication environment.

FIG. 4 illustrates digital interference cancellation and analog interference cancellation for cancelling interference in FDR communication. In the case of digital cancellation 410, various techniques such as beamforming may be applied to cancel self-interference, and the range of interference cancellation may be between about 20 dB and 25 dB.

In analog cancellation 400, which is implemented in a second chain of transmit chains that is between the digital cancellation and the antenna cancellation, interference cancellation signals are directly created through digital estimation of self-interference and summed in the receiver. That is, the analog cancellation may be implemented such that directly received transmission/reception signals are cancelled by adding a signal produced by inverting a signal of the transmitter to a signal of the receiver. The maximum value of cancellation range of the antenna cancellation may be 45 dB.

Figure 5:
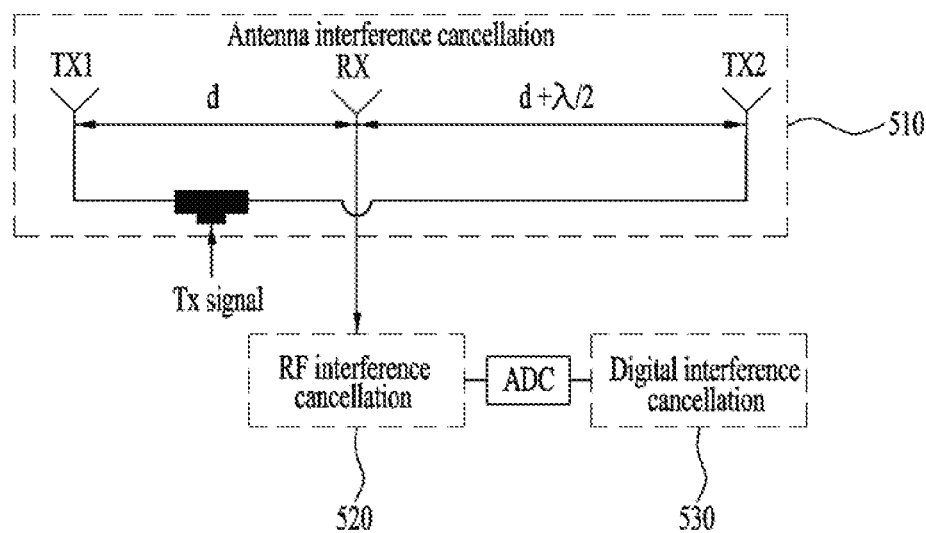
FIG. 5 illustrates antenna interference cancellation for cancelling interference in an FDR communication environment.

FIG. 5 illustrates antenna interference cancellation for cancelling interference in an FDR communication environment.

In antenna cancellation 510, a transceiver configured with two transmit antennas and one receive antenna causes signals transmitted from the two transmit antennas to have phases inverted by 180 degrees when the signals are introduced into the receive antenna. Thereby, antenna cancellation may be implemented such that the phase difference between the signals transmitted from the two transmit antennas becomes 180 degrees. Thereby, the aggregate signal received by the received antenna positioned between the transmit antennas may become null, i.e., 0. In other words, if the two transmit antennas are spaced apart from the receive antenna such that the distance between one transmit antenna and the receiver differs by $\lambda/2$ from the distance between the other transmit antenna and the receive antenna, the phases of the signals input to the receive antenna differ from each other by exactly 180 degrees.

In general, the antenna cancellation technique has low complexity and is thus easiest to implement. However, the maximum interference cancellation performance of the antenna cancellation technique is about 20-30 dB, while a self-interference cancellation performance of about 70 dB is required for the FDR system. Accordingly, self-interference cancellation may be achieved through a combination of the aforementioned three techniques 510, 520 and 530. However, there is a specific communication environment in which the performance of antenna cancellation can be maximized.

Figure 6:
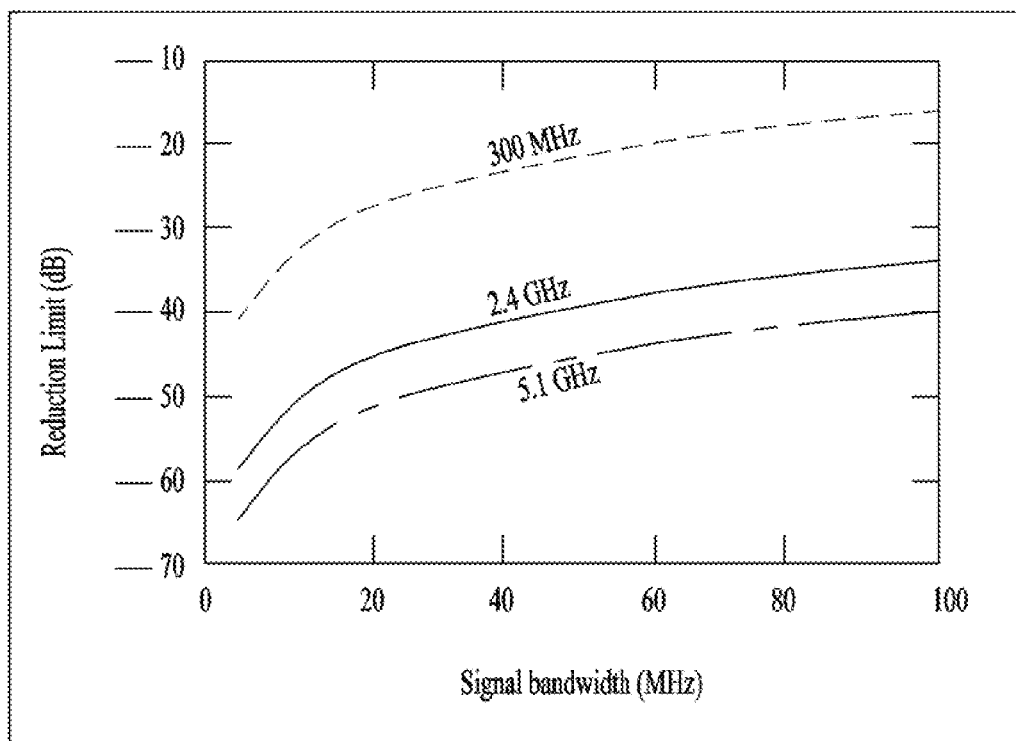
FIG. 6 illustrates interference cancellation efficiency according to antenna interference cancellation in an FDR communication environment.

FIG. 6 illustrates interference cancellation efficiency according to antenna interference cancellation in an FDR communication environment.

As shown in FIG. 6, as system bandwidth decreases and the center frequency is shifted to a higher frequency, the performance of antenna cancellation drastically increases. Accordingly, if a narrow high frequency band is allocated to the FUR communication region, sufficient performance of self-interference cancellation may be ensured by the antenna cancellation technique alone. Accordingly, FDR performance may be ensured, and implementation complexity may also be lowered. A high frequency band of transmission is directed to broadband communication, in which transmission is implemented using a wide frequency band. Accordingly, if a region of the high frequency band of transmission is set as a band for FDR communication, an environment advantageous for self-interference cancellation through antenna cancellation may be created, and thus sufficient performance of self-interference cancellation may be achieved.

3. Self-Interference Mitigation Scheme

As described above, self-interference is caused by direct introduction of a signal, transmitted from a UE or a BS, to a receiver of the same UE or BS. Accordingly, an object of the present invention is to reduce self-interference generated in a resource region used for a BS for downlink control channel transmission and a resource region used for a UE for uplink data channel transmission.

A description will be given of methods for cancelling interference between a control channel transmitted on downlink by a BS and a data channel transmitted on uplink by a UE.

Figure 7:
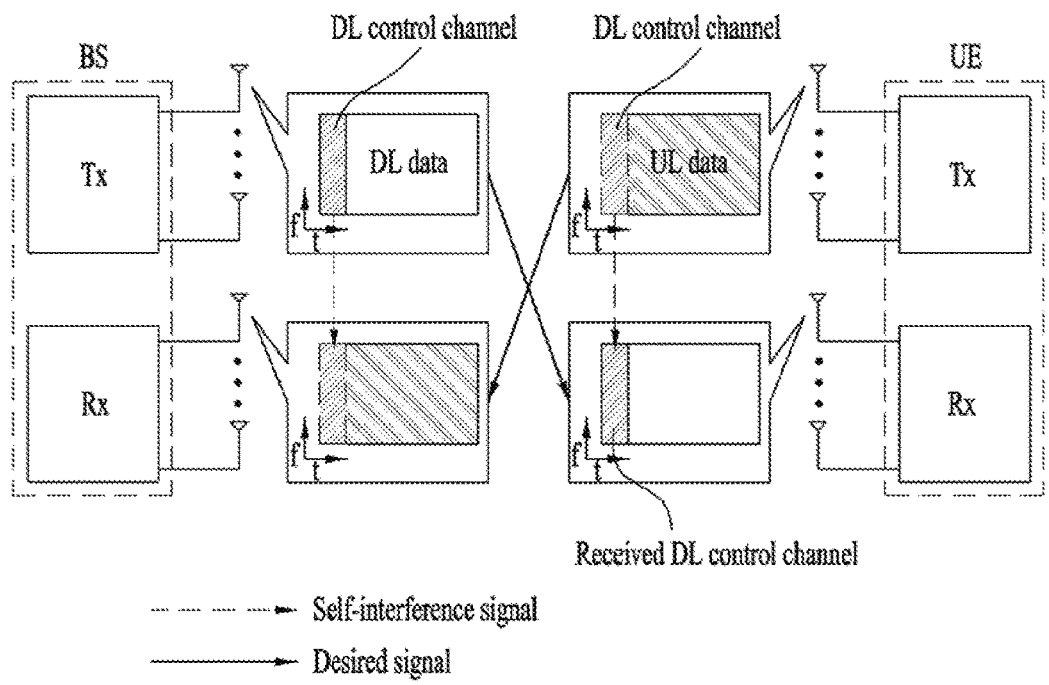
FIG. 7 illustrates a control channel overlap region related to an embodiment of the present invention.
Figure 8:
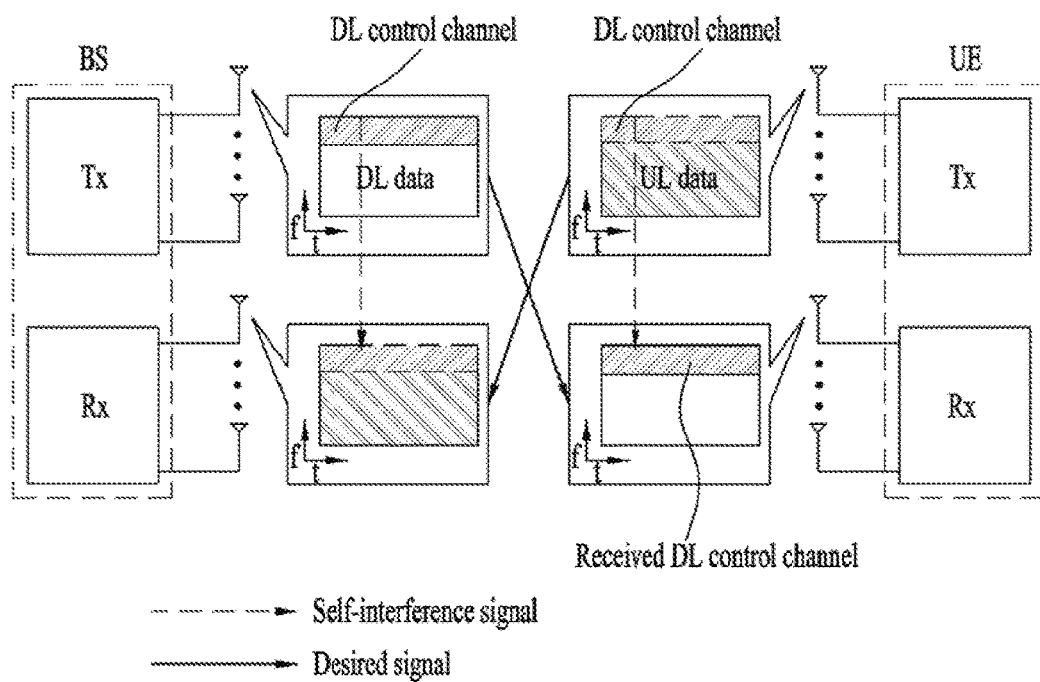
FIG. 8 illustrates a control channel overlap region related to another embodiment of the present invention.

FIGS. 7 and 8 illustrate a control channel overlap region related to an embodiment of the present invention. FIG. 7 shows occupation of time/frequency resources by a downlink control channel according to time division multiplexing (TDM) in an FUR communication environment and FIG. 8 shows occupation of time/frequency resources by a downlink control channel according to frequency division multiplexing (FDM) in an FDR communication environment.

An uplink data channel transmitted from a UE is directly applied to a receiver of the UE in an FUR communication environment, as represented by dotted lines in FIGS. 7 and 8, generating self-interference. Accordingly, detection accuracy of a downlink control channel, which is received by the UE from a BS, decreases due to self-interference from the uplink data channel of the UE.

Various interference cancellation schemes for canceling such self-interference can be applied as described above. However, there is a limitation on application of digital interference cancellation and analog interference cancellation which perform beamforming on the downlink control channel that needs to be commonly received by UEs. Accordingly, in embodiments illustrated in FIGS. 7 and 8, it is necessary to protect a region overlapping with the downlink control channel in time/frequency regions when the UE transmits an uplink data channel such that the UE can stably receive the downlink control channel from the BS.

In the example of using resources according to TDM, shown in FIG. 7, a region where the downlink control channel and the uplink data channel overlap is arranged in the frequency domain. In the example of using resources according to FDM, shown in FIG. 8, a region where the downlink control channel and the uplink data channel overlap is arranged in the time domain.

A description will be given of a method of protecting a region where a downlink control channel and an uplink data channel overlap in an FDR communication environment as shown in FIGS. 7 and 8.

A BS transmits, to a UE, information about the position, size and arrangement of a region (referred to as "overlap region" hereinafter) in which a downlink control channel and an uplink data channel overlap. That is, the UE receives, from the BS, information about a region overlapping with a resource region allocated to the downlink control channel received from the BS from among resource regions allocated to the uplink data channel transmitted from the UE to the BS.

The UE needs to detect the downlink control channel with stability since the downlink control channel includes important information such as scheduling information or system information from the BS. Accordingly, the UE can perform various operations for minimizing the influence of self-interference caused by transmission of the uplink data channel on reception of the downlink control channel. Prior to the operations, the UE needs to acquire information about the overlap region. The information about the overlap region, acquired by the UE, becomes a criterion of application of various schemes for protecting the downlink control channel by the UE.

The information about the overlap region can be generated and transmitted to the UE according to various embodiments. For example, the BS can broadcast the position of the downlink data channel to all UEs linked thereto. A description will be given of embodiments in which the BS transmits the information about the overlap region to the UE.

Figure 9:
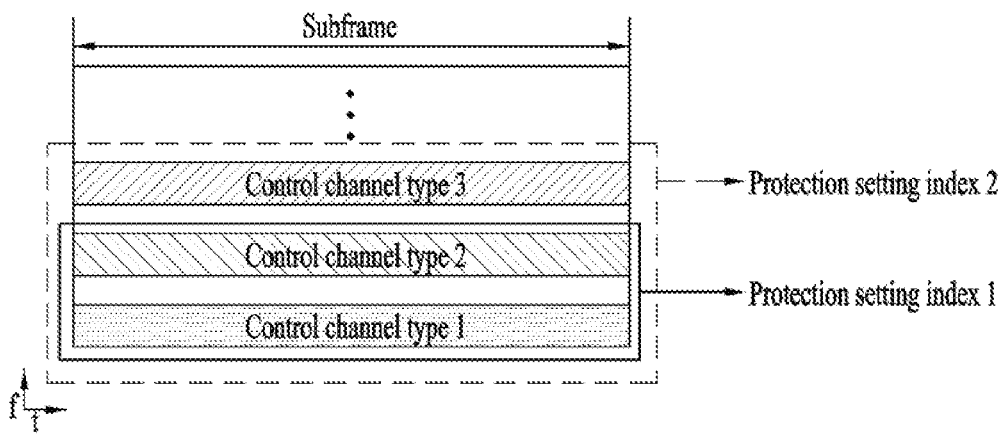
FIG. 9 illustrates a process of setting an overlap region according to control channel priority according to an embodiment of the present invention.

FIG. 9 illustrates a process of setting an overlap region according to control channel priority according to an embodiment of the present invention.

According to an embodiment of the present invention, the BS may set a downlink control channel having highest priority from among downlink control channels to an overlap region and inform the UE of the overlap region. That is, when some control channels have high priority, the BS can transmit information about the control channels having high priority to the UE as information about an overlap region.

A control channel having high priority refers to a control channel preferentially detected by the UE. The BS may set an overlap region differently according to control channel priority and sequentially transmit information about the overlap region to the UE. In other words, the BS can preferentially transmit information about a control channel having high priority to the UE as information about an overlap region and transmit information about a control channel having lower priority later.

For example, when the BS transmits a downlink control channel according to FDM, a resource region for UE-specific grant in the downlink control channel may have higher priority than a resource region for common system information. In this case, the BS sets the resource region for the common system information as an overlap region and transmits information about the overlap region to the UE. Upon reception of the information about the overlap region, the UE can perform operation for protecting the resource region for the common system information, from among resource regions of the downlink control channel, from self-interference (caused by transmission of an uplink data channel).

Such overlap region may be set depending on the type of information included in a control channel. In FIG. 9, control channel types 1, 2 and 3 represent different types of information included in a control channel. In the following, a case in which the BS sets control channel types 1 and 2 to an overlap region corresponds to a case in which a protection setting index is set to 1, and a case in which the BS sets control channel types 1, 2 and 3 to an overlap region corresponds to a case in which the protection setting index is set to 2. That is, different protection setting indices mean different control channels set to an overlap region.

Table 1 shows an embodiment in which an overlap region is set differently according to the protection setting index when the BS transmits the downlink control channel according to FDM, as illustrated in FIG. 9.

TABLE 1

| Protection setting index | Content | Protection priority | Broadcasting bits (4 bits) |
|---|---|---|---|
| 1 | Control channel type 1<br>Control channel type 2 | 1. Type 1<br>2. Type 2 | 0000<br>0010 (a total of 8 bits) |
| 2 | Control channel type 1<br>Control channel type 2<br>Control channel type 3 | 1. Type 1<br>2. Type 3<br>3. Type 2 | 0000<br>0100<br>0010 (a total of 12 bits) |
| ... | ... | ... | ... |

In Table 1, when the protection setting index is set to "1", control channels (content) corresponding to control channel types 1 and 2 are included in an overlap region, and control channel type 1 has highest priority. That is, the overlap region may include two or more control channels having different priority levels. The position of control channel type 1 included in the overlap region is represented by "0000" and the position of control channel type 2 is represented by "0010". That is, the BS can configure a bitmap including the position, arrangement and size of the overlap region so as to inform the UE of information about the overlap region through the bitmap.

When the protection setting index is set to "2", the BS notifies the UE that control channels corresponding to control channel types 1, 2 and 3 are set to an overlap region. The control channels included in the overlap region have different priorities and a bitmap composed of four bits indicating the control channels may be transmitted to the UE.

In other words, the BS determines priority of some or all control channels and notifies the UE of information about positions of control channels that need to be protected by the UE from self-interference of the UE when the UE transmits an uplink data channel.

In another embodiment, the UE may feed back information about self-interference cancellation (SIC) capacity thereof to the BS before the BS notifies the UE of information about an overlap region. The BS may set the overlap region in consideration of the SIC capacity of the UE and transmit the information about the overlap region to the UE.

As described above, a UE needs to protect a region of a downlink control channel, which overlaps with an uplink data channel, in order to receive the downlink control channel with stability. However, a degree of protection for the overlap region may be set differently according to SIC capacity of the UE communicating with the BS.

For example, when SIC capacity necessary for the UE to completely cancel self-interference is −100 dB and all UEs linked to the BS have such SIC capacity, the UEs can freely use uplink data channel resources irrespective of how overlap regions in downlink control channel regions are set.

However, if the UEs have SIC capacity of −90 dB, the UEs cannot completely cancel self-interference. Accordingly, the BS sets only downlink control channels, in which the influence of interference must be cancelled, to an overlap region in consideration of SIC capacity of the UEs and notifies the UEs of the overlap region. For example, in the following table 2, SIC capacity of a UE is used as an index of information about an overlap region.

TABLE 2

| Protection setting index | SIC capacity | Content | Protection priority | Broadcasting bits (4 bits) |
|---|---|---|---|---|
| 1 | −100 dB ≤ $C_{SIC}$ ≤ −90 dB | Control channel type 1<br>Control channel type 2 | 1. Type 1<br>2. Type 2 | 0000<br>0010 (A total of 8 bits) |
| 2 | −90 dB ≤ $C_{SIC}$ ≤ −80 dB | Control channel type 1<br>Control channel type 2 | 1. Type 1<br>2. Type 3 | 0000<br>0100 |

TABLE 2-continued

| Protection setting index | SIC capacity | Content | Protection priority | Broadcasting bits (4 bits) |
|---|---|---|---|---|
| | | Control channel type 3 | 3. Type 2 | 0010 (A total of 12 bits) |
| ... | ... | ... | ... | ... |

As shown in Table 2, the BS can consider SIC capacity of a UE when configuring information about an overlap region, which will be transmitted to the UE. That is, the BS can set fewer downlink control channel regions to an overlap region as SIC capacity of the UE increases. Conversely, the BS sets more downlink control channel regions to an overlap region as SIC capacity of the UE decreases.

Information about the SIC capacity needs to be fed back from the UE and may be represented as levels through quantization. For example, the information about the SIC capacity, fed back from the UE to the BS, can be configured as shown in the following table 3.

TABLE 3

| SIC capacity | Feedback information |
|---|---|
| $-100$ dB $\leq C_{SIC} \leq -90$ dB | 0000 |
| $-90$ dB $\leq C_{SIC} \leq -80$ dB | 0001 |
| $-80$ dB $\leq C_{SIC} \leq -70$ dB | 0010 |
| ... | ... |

The feedback information about the SIC capacity may be transmitted by the UE to the BS semi-statically, periodically or at the request of the BS. In Tables 2 and 3, 10 dB, a criterion for classifying the SIC capacity of the UE, is exemplary and the SIC capacity of the UE may be divided according to various criteria.

According to another embodiment, the BS may configure information about an overlap region depending on a control channel structure in an FUR communication environment, as described above with reference to FIGS. 7 and 8. For example, the BS can set different information about an overlap region when the control channel structure corresponds to the TDM structure shown in FIG. 7 and corresponds to the FDM structure shown in FIG. 8.

When a downlink control channel is configured according to TDM, n symbols, some or all of N symbols in a subframe, can be set to an overlap region. Accordingly, the BS can transmit, to the UE, information about some or all symbols set to the overlap region as information about the overlap region. When a downlink control channel is configured according to FDM, an overlap region may be set on a subcarrier basis.

As described above, the BS sets a downlink control channel region, which needs to be protected from the influence of self-interference of a UE when the UE transmits an uplink data channel, to an overlap region. When the BS sends information about the overlap region to the UE, the UE receives the information about the overlap region and performs uplink data channel transmission in consideration of the information. That is, the UE can reduce the influence of self-interference due to uplink data channel transmission in consideration of the information about the overlap region and receive the downlink control channel with stability by mitigating self-interference caused by the overlap region.

4. Apparatus Configuration

Figure 10:
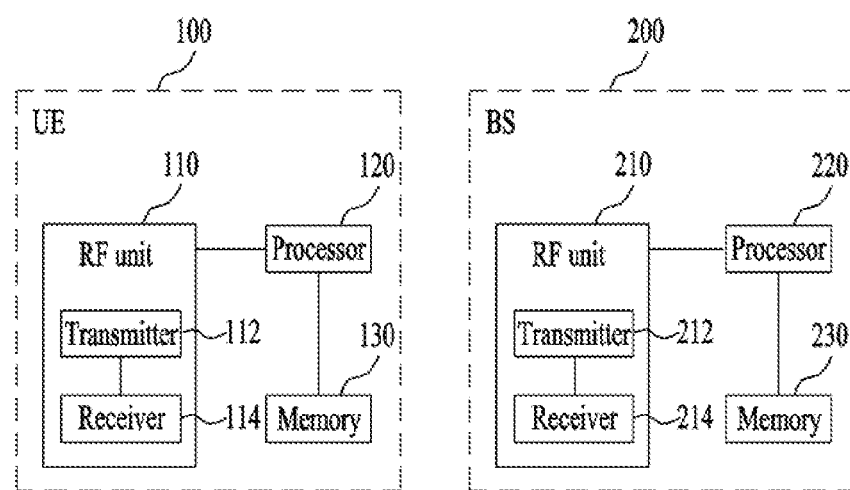
FIG. 10 is a block diagram of a UE and a BS according to an embodiment of the present invention.

FIG. 10 is a block diagram of a UE and a BS according to an embodiment of the present invention.

Referring to FIG. 10, a UE 100 and a BS 200 may respectively include radio frequency (RF) units 110 and 210, processors 120 and 220 and memories 130 and 230. While FIG. 10 shows one-to-one communication between the UE 100 and the BS 200, communication between a plurality of UEs and the BS 200 may be performed.

The RF units 110 and 210 may respectively include transmitters 112 and 212 and receivers 114 and 214. The transmitter 112 and the receiver 114 of the UE 100 may be configured to transmit/receive signals to/from the BS 200 and other UEs. The processor 120 of the UE 100 may be functionally connected to the transmitter 112 and the receiver 114 to control the transmitter 112 and the receiver 114 to transmit/receive signals to/from other devices. In addition, the processor 120 may process signals to be transmitted, transmit the processed signals to the transmitter 112 and process signals received by the receiver 114.

The processor 120 may store information included in an exchanged message in the memory 130 as necessary. The UE 100 having the aforementioned configuration may perform the aforementioned methods according to embodiments of the present invention.

The transmitter 212 and the receiver 214 of the BS 200 may be configured to transmit/receive signals to/from other BSs and UEs. The processor 220 of the BS 200 may be functionally connected to the transmitter 212 and the receiver 214 to control the transmitter 212 and the receiver 214 to transmit/receive signals to/from other devices. In addition, the processor 220 may process signals to be transmitted, transmit the processed signals to the transmitter 212 and process signals received by the receiver 214. The processor 220 may store information included in an exchanged message in the memory 230 as necessary. The BS 200 having the aforementioned configuration may perform the aforementioned methods according to embodiments of the present invention.

The processors 120 and 220 of the UE 100 and the BS 200 control (e.g. adjust and manage) operations of the UE 100 and the BS 200. The processors 120 and 220 may be respectively connected to the memories 130 and 230 for storing program code and data. The memories 130 and 2130 are respectively connected to the processors 120 and 220 and store operating systems, applications and general files.

The processors 120 and 220 may be called controllers, microcontrollers, microprocessors, microcomputers or the like. The processors 120 and 220 may be implemented using hardware, firmware, software or a combination thereof. When embodiments of the present invention are implemented using hardware, application specific integrated circuits (ASICs), digital signal processors (DSPs), digital signal processing devices (DSPDs), programmable logic devices (PLDs), field programmable gate arrays (FPGAs), etc., which are configured to perform the present invention, may be included in the processors 120 and 220.

The aforementioned method may be implemented as programs executable in computers and executed in general computers that operate the programs using computer readable media. In addition, data used in the aforementioned method may be recorded in computer readable recording media through various means. It should be understood that program storage devices that can be used to describe storage devices including computer code executable to perform various methods of the present invention do not include temporary objects such as carrier waves or signals. The computer readable media include storage media such as magnetic recording media (e.g. ROM, floppy disk and hard disk) and optical reading media (e.g. CD-ROM and DVD).

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for receiving a downlink channel by a user equipment (UE) with full duplex radio (FDR) communication support in a wireless communication, the method comprising:
   transmitting, to a base station (BS), first information related to a self-interference cancellation (SIC) capability of the UE;
   receiving, from the BS, second information related to overlapped resources between an uplink channel and the downlink channel based on the first information;
   mitigating a self-interference by the uplink channel in the overlapped resources; and
   receiving, from the BS, the downlink channel based on the mitigated self-interference in the overlapped resources,
   wherein time division multiplexing (TDM) or frequency division multiplexing (FDM) based on FDR communication environment is used for the overlapped resources,
   wherein a number of the overlapped resources is inversely proportional to the SIC capability of the UE,
   wherein the first information comprises a bitmap indicating one of a plurality of range sections for distinguishing SIC capabilities,
   wherein the SIC capability of the UE is included in the one of the plurality of range sections, and
   wherein the first information is semi-statically transmitted.

2. The method of claim 1, wherein the overlapped resources are resources in which the downlink channel is transmitted, and the downlink channel is for control information.

3. The method of claim 1, wherein the overlapped resources are obtained based on a Modulation & Coding Scheme (MCS) level.

4. The method of claim 1, wherein a power of the uplink channel in the overlapped resources is lower than a power of the uplink channel in resources other than the overlapped resources.

5. The method of claim 4, wherein the power of the uplink channel in the overlapped resources is obtained based on at least one of Self-interference cancellation (SIC) capability of the UE or SIC capability of the BS.

6. The method of claim 1, wherein a reference signal (RS) for the uplink channel in the overlapped resources is different from a RS for the uplink channel in resources other than the overlapped resources.

7. The method of claim 1, wherein a Modulation & Coding Scheme (MCS) level for the uplink channel is obtained based on signal to noise ratio (SNR) or signal to interference-plus-noise ratio (SINR) for the uplink channel.

8. An apparatus with full duplex radio (FDR) communication support for receiving a downlink channel in a wireless communication, the apparatus comprising:
   at least one processor; and
   at least one computer memory operably connectable to the at least one processor and storing instructions that, when executed by the at least one processor, perform operations comprising:
   transmitting, to a base station (BS), first information related to a self-interference cancellation (SIC) capability of the apparatus;
   receiving, from the BS, second information related to overlapped resources between an uplink channel and the downlink channel based on the first information;
   mitigating a self-interference by the uplink channel in the overlapped resources; and
   receiving, from the BS, the downlink channel based on the mitigated self-interference in the overlapped resources,
   wherein time division multiplexing (TDM) or frequency division multiplexing (FDM) based on FDR communication environment is used for the overlapped resources,
   wherein a number of the overlapped resources is inversely proportional to the SIC capability of the apparatus,
   wherein the first information comprises a bitmap indicating one of a plurality of range sections for distinguishing SIC capabilities,
   wherein the SIC capability of the apparatus is included in the one of the plurality of range sections, and
   wherein the first information is semi-statically transmitted.

9. The apparatus of claim 8, wherein the overlapped resources are resources in which the downlink channel is transmitted, and the downlink channel is for control information.

10. The apparatus of claim 8, wherein the overlapped resources are obtained based on a Modulation & Coding Scheme (MCS) level.

11. The apparatus of claim 8, wherein a power of the uplink channel in the overlapped resources is lower than a power of the uplink channel in resources other than the overlapped resources.

12. The apparatus of claim 11, wherein the power of the uplink channel in the overlapped resources is obtained based on at least one of Self-interference cancellation (SIC) capability of the apparatus or SIC capability of the BS.

13. The apparatus of claim 8, wherein a reference signal (RS) for the uplink channel in the overlapped resources is different from a RS for the uplink channel in resources other than the overlapped resources.

14. The apparatus of claim 8, wherein a Modulation & Coding Scheme (MCS) level for the uplink channel is obtained based on signal to noise ratio (SNR) or signal to interference-plus-noise ratio (SINR) for the uplink channel.

15. A method for transmitting a downlink channel by a base station (BS) with full duplex radio (FDR) communication support in a wireless communication, the method comprising:
   receiving, from a user equipment (UE), first information related to a self-interference cancellation (SIC) capability of the UE;

transmitting, to the UE, second information related to overlapped resources between an uplink channel and the downlink channel based on the first information; and transmitting, to the UE, the downlink channel in the overlapped resources, wherein the second information is for mitigating a self-interference by the uplink channel in the overlapped resources, wherein time division multiplexing (TDM) or frequency division multiplexing (FDM) based on FDR communication environment is used for the overlapped resources, wherein a number of the overlapped resources is inversely proportional to the SIC capability of the UE, wherein the first information comprises a bitmap indicating one of a plurality of range sections for distinguishing SIC capabilities, wherein the SIC capability of the UE is included in the one of the plurality of range sections, and wherein the first information is semi-statically received.

16. A base station (BS) with full duplex radio (FDR) communication support for transmitting a downlink channel in a wireless communication, the BS comprising:

at least one transceiver;

at least one processor; and at least one computer memory operably connectable to the at least one processor and storing instructions that, when executed by the at least one processor, perform operations comprising:

receiving, from a user equipment (UE), first information related to a self-interference cancellation (SIC) capability of the UE;

transmitting, to the UE, second information related to overlapped resources between an uplink channel and the downlink channel based on the first information; and transmitting, to the UE, the downlink channel in the overlapped resources, wherein the second information is for mitigating a self-interference by the uplink channel in the overlapped resources, wherein time division multiplexing (TDM) or frequency division multiplexing (FDM) based on FDR communication environment is used for the overlapped resources, wherein a number of the overlapped resources is inversely proportional to the SIC capability of the UE, wherein the first information comprises a bitmap indicating one of a plurality of range sections for distinguishing SIC capabilities, wherein the SIC capability of the UE is included in the one of the plurality of range sections, and wherein the first information is semi-statically received.

* * * * *